United States Patent

Abrahamsson

[15] 3,651,486

[45] Mar. 21, 1972

[54] TIME INTERVAL GENERATING APPARATUS

[72] Inventor: Sixten Abrahamsson, Sodermalmsgatan 31, 43139 Molndal, Sweden

[22] Filed: Nov. 6, 1969

[21] Appl. No.: 874,665

[30] Foreign Application Priority Data

Nov. 6, 1968 Sweden..................15053/68

[52] U.S. Cl. ........................................340/172.5
[51] Int. Cl. ............................................G06f 3/00
[58] Field of Search ..................340/172.5; 328/129, 48, 58; 307/265, 220, 293

[56] References Cited

UNITED STATES PATENTS

| 3,050,708 | 8/1962 | Alstyne et al. | 328/129 X |
| 3,297,952 | 1/1967 | Thylander | 328/58 X |
| 3,388,346 | 6/1968 | Roof et al. | 307/265 X |
| 3,509,473 | 4/1970 | La Porta | 328/129 X |

Primary Examiner—Raulfe B. Zache
Attorney—Waters, Roditi, Schwartz & Nissen

[57] ABSTRACT

An apparatus is disclosed to be used in conjunction with a suitable general purpose digital computer in programmed time-of-flight mass spectrometric measurements to provide well defined aperture signals with an adjustable time delay from an initiating pulse, adjustable repetition times and adjustable pulse length. A high-frequency generator, e.g., a 100 megacycles/second generator, is used as a clock pulse generator. Two subtract-1-counters are used for time determination. The computer supplies the counters with a first and second numerical quantity, designating the time delay from the initiating pulse, and the sum of the time delay and the pulse length respectively, in terms of the number of pulses from the pulse generator required to measure out the respective time spans. The counters are provided with zero-content outputs connected to the setting and resetting inputs respectively of a bistable flip-flop. At an instant determined by an initiating signal both counters start a countdown at a rate determined by the HF-generator. The flip-flop changes its output state when the first counter has become emptied, i.e., after a time interval corresponding to the desired delay, and returns to its initial output state when the second counter has become emptied. Thus the output from the flip-flop represents the desired time aperture signal.

5 Claims, 1 Drawing Figure

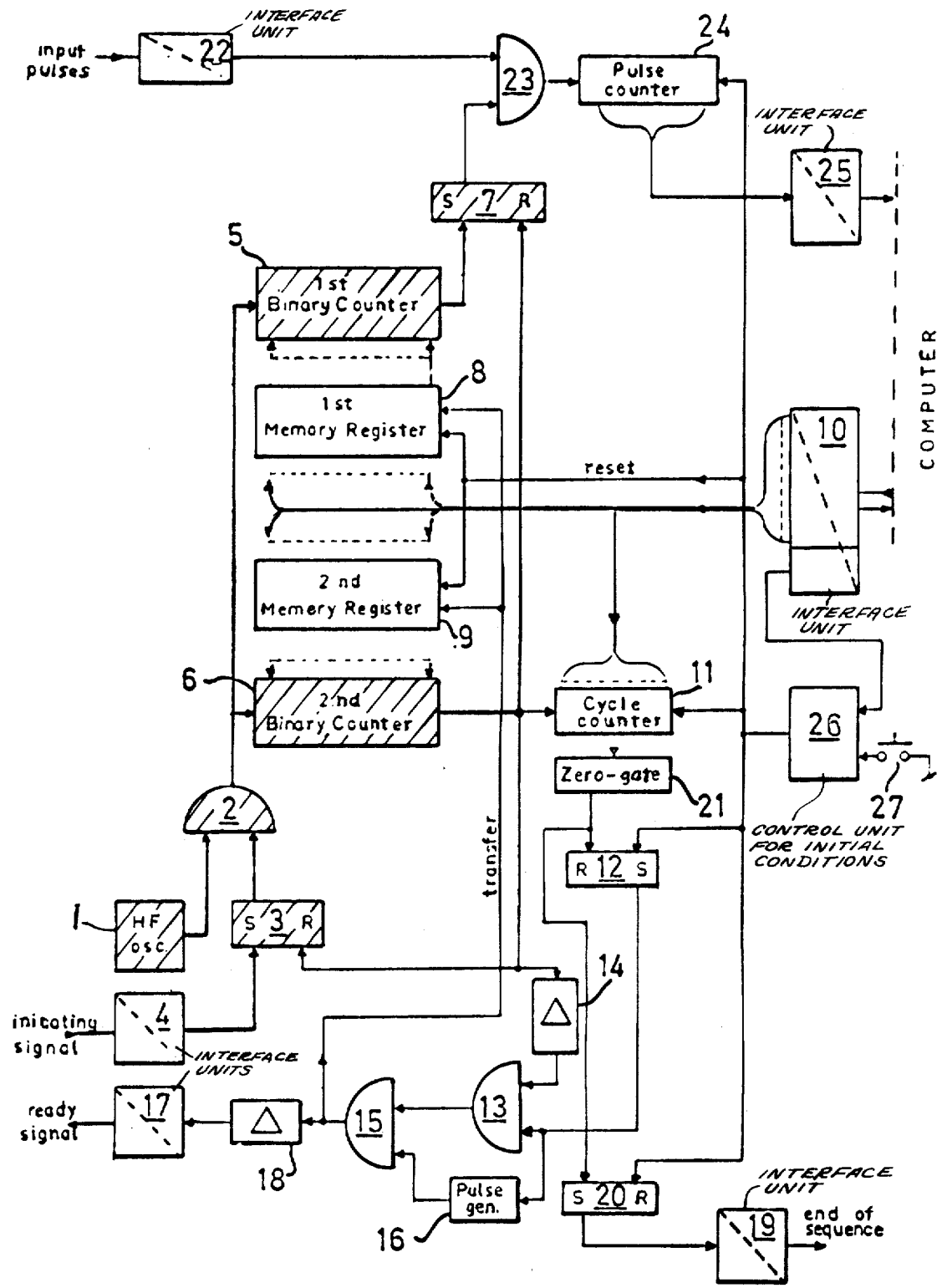

TIME INTERVAL GENERATING APPARATUS

BACKGROUND OF THE INVENTION

The present invention relates to a high accuracy time interval generating device, and in particular to a device for generating a time interval of a predetermined exact duration commencing at a time instant with a predetermined exact delay from a start time. A time interval of this kind is usually called a time aperture. The time aperture may be utilized as a signal for activating a recording of a physical event taking place in the time aperture and usually, but not necessarily initiated by, or itself initiating the start time signal.

Various circuits have been proposed for generating what may be called time aperture pulses, e.g., in radar systems. Broadly speaking these circuits have either been analogue circuits, i.e., circuits in which a quantity, usually an electric voltage or current has been made to vary as a function of time, and the circuits have made use of predetermined amplitudes of this quantity as an indication signal or signals indicative of the elapsed time. The accuracy of such a circuit is, however, limited by the accuracy of the components in the circuit and its supply voltages. Experience shows that an accuracy better than about 0.5 percent is difficult to obtain with this type of circuit.

It is also possible to use a pulse delay circuit, e.g., delaying the start pulse a predetermined interval of time and using it for triggering a pulse generator, the output of which is to represent the desired time aperture. The time accuracy will then be dependent on the accuracy of the delay circuit and of the pulse generating circuit, which, however, also depend on the accuracy of the components used in the circuits and of the supply voltages. None of these circuits are therefor suitable for an application where a high degree of time accuracy is required.

One application for a high accuracy time generator is in a time-of-flight mass spectrometer in which the mass and abundance of ionized particles, and sometimes neutral particles, is determined by subjecting a stream of such particles to an electric field and counting the number of particles arriving at a point along the path within a predetermined time interval, the so-called time aperture. To provide a measurement result representative of the mass of the particles as counted, the count of the particles is effected during a time interval having a selected length, the time interval commencing a selected and adjustable time after a start time when the particles are emitted from or pass a starting point, and ends at a selected time.

Obviously, the resolving accuracy of a measuring apparatus of this kind is essentially dependent on the ability to provide an accurate and, compared with the flight time of particles to be counted, small time aperture for the measurement. However, the possibilities of providing time apertures with a desired accuracy have been restricted when using electronic time analogue circuits due to the unavoidable lack of precision when measuring extremely short time intervals with such time circuits.

Mass spectrometers comprising analogue means for the measuring are known, e.g., from the article "Recent Advances in Time-of-Flight Mass Spectrometry" by Donald C. Damoth in the journal "Advances in Analytical Chemistry and Instrumentation," Vol. 4, John Wiley & Sons Inc., New York.

SUMMARY OF THE INVENTION

One object of the present invention is to provide a time determining device by means of which extremely short times and time intervals can be determined with high accuracy.

A further object of the invention is to provide a time counter which is programmable by means of a computer and which, to effect the necessary time measurement and by means of a selectable number of iterated measurements sums up data channel pulses to be counted and which thus coincide with a time aperture having a selected time delay relative to a point of time represented by a start pulse triggering the measuring device.

By choosing high quality components available at present in a device according to the application, a time aperture can be provided, the size of which is selectable in intervals of 10 nanoseconds from 0 microseconds and upwards, the total delay and time aperture time being determined by the capacity of counters to count pulses defining a smallest time unit of the device. So, for instance, a total time delay of between 0 and 40 microseconds is attainable by use of a 12-bit counter counting pulses having a repetition frequency of 10 megacycles per second.

A further object according to the invention is to provide a continuous scanning of a time spectrum, as well as a selective measurement at selected time intervals from a start pulse during the appearance of a time aperture created in the device.

For this and other purposes, which will be evident from the following description, a time count device according to the invention, which as such is composed by a number of electronic components for pulse generation, pulse count and evaluation of count results each as such known per se, comprises the following means, namely, a high frequency, high accuracy pulse generator adapted to generate equally spaced clock signal pulses, a first and a second presettable counter, each of said counters having a substract-1-input and a zero-content output, setting means, operable prior to said initiating signal, for setting the numerical content of said first counter equal to a number of clock signal pulses corresponding to said delay, and for setting the numerical content of said second counter equal to the number of clock signal pulses corresponding to the sum of said delay and said duration, gating means interposed between the output from said high frequency pulse generator and said subtract-1-inputs and adapted to be opened by said initiating signal, and means for generating a time aperture signal commencing at the zero-output signal from said first counter and terminating at the zero-output signal from said second counter.

BRIEF DESCRIPTION OF THE DRAWING

The invention is further illustrated by the following description of an embodiment thereof with reference to the accompanying drawing, the sole FIGURE of which is a block diagram of a time aperture signal generating apparatus programmable by means of a computer in communication with the apparatus via interface means to provide a computer controlled measuring program with the apparatus.

DETAILED DESCRIPTION OF THE INVENTION

The embodiment shown in the drawing and described in the following is particularly suited as a time aperture signal generator for counting the number of events, e.g., the number of particles arriving at a transducer, during a well defined time interval. The apparatus is connected to a general purpose computer used for controlling the apparatus and evaluating the results of the respective experiments.

Thus a high accuracy, high frequency generator 1 is provided e.g., an oscillator having an output frequency of 100 megacycles per second, preferably in the form of square wave pulses. The frequency may be lower, when a corresponding coarser resolution is acceptable, or it may be higher if the apparatus is provided with switching circuits of correspondingly faster response. Thus the frequency chosen depends on one hand upon the desired accuracy in the measurement, but is limited by practical and present-day technological requirements.

The output signal from the generator 1 is fed to a first input terminal of a coincidence gate 2, the second input of which is connected to the output of a bistable flip-flop 3, adapted to be switched to its active output state by a signal from an interface unit 4, and ultimately from a signal indicating that the experiment may start. This signal, which preferably may emanate from the experiment or process to be evaluated will be designated the "initiating signal" hereinafter and in the claims. The bistable flip-flop 3 is reset to its initial passive output state in the absence of the initiating signal and at the appearance of a zero-output signal from one of the counters which will be described in detail below, which signal occurs when the measurement or experiment is concluded.

The output signal from the gate 2 is connected to the respective subtract-1-inputs of a first binary counter 5 and a second binary counter 6. Each of the two counters 5 and 6 is provided with a zero-content output, i.e., an output on which a signal appears when the respective counter contains nothing but zeros. Such a signal may be generated for instance by the inability of the counter to satisfy a "borrow" command from the least significant stage in the counter. A second bistable flip-flop or similar switching device 7 derives its set-input from the zero-content output of the first binary counter 5 and its reset-input from the zero-content output of the second binary counter 6. The output from the second bistable switching device 7 may be used as the desired time aperture signal in the following manner. At a time instant, and in a manner that will be described in detail below, prior to the appearance of the initiating signal, the first binary counter 5 is preset to a numerical content equal to the number of clock pulses from the HF-oscillator 1 required to measure the time interval between the commencement of the initiating signal and the desired delayed commencement of the time aperture signal. The numerical content of the second binary counter 6 is set to this amount plus the actual desired time aperture length. Thus when an initiating signal appears on the set-input of the first bistable switching device 3 this will switch to its active output state causing the clock pulses from the HF-generator 1 to pass the gate 2 and arrive at the subtract-1-inputs of the first and second binary counters 5 and 6 respectively. The counters will count down in synchronization, and when the first counter 5 becomes empty this will cause the second bistable device 7 to switch to its active output state. The count-down of the second counter 6 continues, since the initial numerical content of the second counter always exceeds that of the first by an amount corresponding to the length of the desired time aperture, but when the second binary counter 6 has become emptied this will cause the second bistable device 7 to switch back to its initial, passive output condition thus terminating the time aperture signal.

After having thus described the basic parts of the apparatus, consisting of the shaded units 1,2,3,4,5,6,7 in the drawing and their interconnections, attention will now be directed to the information transfer, interlock and control circuitry of the apparatus.

The first binary counter 5 is supplied with numerical information from a first binary memory register 8, the information transfer preferably taking place in a parallel mode as indicated in the drawing. The second binary counter 6 is supplied with numerical information in a similar way from a second binary memory register 9. The binary registers 8 and 9 further each have a transfer input connected to the time interlock circuit and a reset input connected to the control circuit. Information is supplied to the respective memory registers from a main interface unit 10, e.g., a unit of the apparatus, a buffer unit or output register of the computer or a similar device. Preferably the information transfer from the output of the main or first interface unit 10 to the input of the respective memory registers 8 and 9, as well as the information transfer from the memory registers to the respective binary counters 5 and 6 takes place in a parallel mode.

In a similar manner, information from the interface unit 10 is supplied to the input terminals of a third binary down-counter or cycle-counter 11 having a reset terminal, a substract-1-input terminal and a zero-content output terminal. The information transfer circuitry so far described operates as follows. The first memory register 8, the second memory register 9 and the cycle counter 11 are initially reset, from the control circuit which will be described in detail below, and are then set to a numerical content as determined by a program of a computer (not shown) via the interface unit 10. The same interface unit 10 then supplies the first memory register 8, the second memory register 9 and the cycle counter 11 with the required numerical quantities, ultimately derived from the computer program. The information from the memory registers 8 and 9 is then transferred to the first binary counter 5 and second binary counter 6 respectively. By repetition, the circuit may be used to generate a train of time aperture pulses of predetermined length separated by predetermined intervals. The repetition is accomplished in the following manner.

The cycle down-counter is initially set to a numerical content corresponding to the number of desired repetitions. Each time the second binary counter 6 reaches zero, its zero-content output pulse is fed to the subtract-1-input of the cycle counter 11 which counts down one unit. As long as no signal appears at the zero-content output of the cycle counter 11, the pulse generation is continued by means of a transfer signal generated in the time-interlock circuit and fed to the first and second memory registers, causing the contents of the registers at the time to be copied into the first and second binary counters respectively. A zero-content output from the cycle counter 11 blocks, however, the time-interlock circuit, and the process is interrupted.

The time-interlock circuit referred to above comprises a third bistable switching device or flip-flop 12 which is switched to its active output state by a signal from the control circuitry at the same time as inter alia the first and second memory registers and the cycle binary counter are cleared. The active output from the third flip-flop 12 is connected to one input of a second coincidence gate 13, the other input of which is fed with the zero-output signal from the second binary counter 6 via a delay circuit 14. The output from the second coincidence gate 13 is fed to one input of a third coincidence gate 15, the other input of which is supplied with a signal from the active output of the third flip-flop 12 via a pulse forming circuit 16 such as a Schmidt-trigger. It is evident from the drawing and the description of the circuit, that the output from the third coincidence gate 15 will be a delayed pulse each time the second binary counter 6 reaches its zero state, provided that the cycle counter 11 has not been emptied. The pulse length is determined by the Schmidt-trigger 16 and the pulse is used as a transfer command to the first and second memory registers 8 and 9.

The same circuit is used to generate a ready-signal, i.e., a signal designating that the apparatus is prepared to accept an initiating signal. This pulse is derived from the output of the third coincidence gate 15, and is fed to a second interface unit 17 via a second delay circuit 18. The ready-signal is of course generated each time a transfer signal is generated, but the second interface unit 17 may easily be arranged to respond to the first signal only during one and the same operation sequence of the apparatus.

The termination of one operating sequence of the apparatus is indicated to a third interface unit 19 by a fourth bistable switching device or flip-flop 20, one input of which is connected to the resetting signal from the control circuit and the other input of which is connected to a zero-sense gate 21 of the cycle counter 11. The fourth flip-flop 20 is initially set to its passive state, and is switched to its active output state by a signal from the zero-sense gate 21 indicating that the current sequence of the apparatus is completed.

A fourth interface unit 22 receives the pulses to be counted from the time-of-flight mass spectrometer (not shown), an may contain pulse amplifying and shaping circuits. The pulses are fed to one input of a fourth coincidence gate 23, the second input of which is provided by the second bistable device or flip-flop 7. As mentioned earlier this flip-flop has an output signal representing the desired time aperture signal. The output from the fourth coincidence gate 23 will thus consist of those pulses from the fourth interface unit 22 which coincide with the selected time aperture. The pulses are counted in a pulse counter 24 the output of which is fed to a fifth interface unit 25 from which the computer (not shown) may derive its information.

A control unit 26 is used for providing the initial conditions of the various switching memory and counter circuits in the apparatus. Thus the output from the control unit 25 is used to initially clear the counter 24, the memory registers 8 and 9, and the cycle counter 11, as well as for setting the third flip-flop 12 to its active state, and the fourth flip-flop 20 to its passive output state. The input to the control unit 26 may be either a signal from the main interface unit 10 or from a push-button 27 as shown in the drawing. Controlled by the main interface unit 10 the apparatus operates in the following manner:

Information words are transferred to the main interface unit 10 from the computer (not shown), a first command via the control unit 26 setting up the initial conditions, a second word setting the number of desired cycles in the cycle counter 11, a third and fourth word respectively sets the numerical content of the first and second memory registers 8 and 9 respectively, a fifth word may be used to provide the initiating signal to the interface unit 4, at the same time of course initiating the measured process.

The apparatus described thus makes possible a systematic displacement of the time aperture, so that a time spectrum may be systematically searched. The apparatus may be used in essentially two different modes.

In the first mode, the content of the first and second memory registers 8 and 9 is left unchanged during a number of cycles determined by the content of the cycle counter 11, so that a corresponding number of equally spaced time apertures of equal length are obtained.

In the second mode, the content of the first and second memory registers 8 and 9 is changed each time a zero-content signal from the second counter 6 is obtained, thus making it possible to obtain any desired time interval between two successive apertures as well as any desired width of each time aperture, subject only to the limitations posed by the resolution, i.e., the frequency of the HF-oscillator 1 and the capacity of the respective binary counter.

The control of the apparatus from a general purpose or similar computer thus makes it possible to allocate a time aperture for each desired mass number in one and the same experiment, detecting the number of particles in each time aperture, and successively transferring the information obtained from the pulse counter 24, via the interface unit 25 to the computer (not shown).

It is evident from the above description of a preferred embodiment of the invention, that the basic concept of the invention, namely to use a pair of computer-controlled high speed count-down registers for generating time aperture signals with high accuracy lends itself to various changes and modifications. Such changes and modifications, which are obvious to those skilled in the art, may be made without departing from the scope of the invention and it is intended, therefor, to cover all such changes and modifications in the appended claims.

What I claim is:

1. A time aperture signal generating apparatus for providing a pulse signal of predetermined duration and commencing at a predetermined delay with respect to an initiating signal, said apparatus comprising a high accuracy, high frequency pulse generator adapted to generate equally spaced clock signal pulses, a first and a second presettable counter, each of said counters having a subtract-1-input and a zero-output, setting means, operable prior to said initiating signal, for setting the numerical content of said first counter equal to a number of clock signal pulses corresponding to said delay, and for setting the numerical content of said second counter equal to the number of clock signal pulses corresponding to the sum of said delay and said duration, gating means interposed between the output from said high frequency pulse generator and said subtract-1-inputs and adapted to be opened by said initiating signal, and means for generating a time aperture signal commencing at the zero-output signal from said first counter and terminating at the zero-output signal from said second counter.

2. Apparatus according to claim 1, comprising a first and a second memory register connected respectively to said first and second counters, said memory registers including means to store said numerical contents and provide corresponding setting signals to said first and second counter respectively upon a transfer signal derived from a time interlock circuit prior to the generation in said interlock circuit of a signal designating that the apparatus is ready to receive said initiating signal.

3. Apparatus according to claim 2, wherein the apparatus is operably connected to a general purpose digital computer, said counters and registers being arranged for handling and storing binary numbers, and said registers obtaining their numerical information from said computer.

4. Apparatus as claimed in claim 3, comprising a third presettable cycle counter having a substract-1-input and a zero-content output, means for presetting said third counter to a numerical content corresponding to the number of successive time apertures to be generated as a result of an initiating signal, means connecting said zero-content output of said second counter to said subtract-1-input of said third counter, means connecting said zero-content output of said third counter as an end-of-cycle signal to said computer, and means responsive to a zero-content signal from said first and second binary counters at the termination of each time aperture to transfer the contents in said memory registers to the first and second counters respectively.

5. Apparatus as claimed in claim 4, wherein said third counter is operably connected to said general purpose computer and supplied with its numerical information prior to said initiating signal, said first and second memory registers being connected to receive new information from said computer during the count-down of said first and second counters.

* * * * *